United States Patent [19]
Lee et al.

[11] Patent Number: 5,687,371
[45] Date of Patent: Nov. 11, 1997

[54] SELECTION FROM A PLURALITY OF BUS OPERATING SPEEDS FOR A PROCESSOR BUS INTERFACE DURING PROCESSOR RESET

[75] Inventors: Phillip G. Lee; Milind Karnik, both of Aloha; Blair Milburn, Beaverton, all of Oreg.

[73] Assignee: Intel Corporation, Santa Clara, Calif.

[21] Appl. No.: 490,810

[22] Filed: Jun. 15, 1995

Related U.S. Application Data

[63] Continuation of Ser. No. 128,586, Sep. 27, 1993, abandoned.

[51] Int. Cl.[6] .................................................. G06F 13/38
[52] U.S. Cl. ...................... 395/651; 395/500; 395/309; 395/568
[58] Field of Search ..................................... 395/306, 309, 395/500, 775, 375, 828, 284, 568, 651, 652

[56] References Cited

U.S. PATENT DOCUMENTS

| | | | |
|---|---|---|---|
| 4,030,073 | 6/1977 | Armstrong, Jr. | 395/651 |
| 4,087,857 | 5/1978 | Joyce et al. | 395/572 |
| 4,344,132 | 8/1982 | Dixon et al. | 395/250 |
| 4,654,783 | 3/1987 | Veres et al. | 395/652 |
| 4,674,089 | 6/1987 | Poret | 395/183.04 |
| 4,688,172 | 8/1987 | Wright | 395/651 |
| 4,701,847 | 10/1987 | Nichols | 395/651 |
| 4,727,477 | 2/1988 | Gavril | 395/884 |
| 4,803,622 | 2/1989 | Bain, Jr. et al. | 395/825 |
| 5,113,369 | 5/1992 | Kinoshita | 395/307 |
| 5,175,831 | 12/1992 | Kumar | 395/652 |
| 5,191,653 | 3/1993 | Banks et al. | 395/293 |
| 5,193,199 | 3/1993 | Dalrymple et al. | 395/651 |
| 5,237,676 | 8/1993 | Arimilli et al. | 395/290 |
| 5,255,374 | 10/1993 | Aldereguia et al. | 395/293 |
| 5,263,168 | 11/1993 | Toms et al. | 395/651 |
| 5,263,172 | 11/1993 | Olnowich | 395/800 |
| 5,274,780 | 12/1993 | Nakao | 395/287 |
| 5,300,811 | 4/1994 | Suzuki et al. | 257/691 |
| 5,329,621 | 7/1994 | Burgess et al. | 395/287 |
| 5,465,333 | 11/1995 | Olnowich | 395/281 |

*Primary Examiner*—Parshotam S. Lall
*Assistant Examiner*—Viet Vu
*Attorney, Agent, or Firm*—Blakely, Sokoloff, Taylor & Zafman

[57] ABSTRACT

A method and apparatus for providing an interface from a processor to a bus. The interface is capable of operating at a speed selected from a plurality of speeds. An execution unit is coupled to a register file. The register file comprises a plurality of registers. Each of the registers of the register file is for storing data. The execution unit is for executing instructions. An instruction cache is coupled to the execution unit. The instruction cache and ROM is for storing instructions that can be used by the execution unit. A reset means is also coupled to the execution unit. Furthermore, a bus speed indication means is coupled to the execution unit and to the register files. The bus speed indication means is for receiving a bus speed indication signal. The bus speed indication signal is for indicating the selected operating speed for the bus interface. The reset signal is provided to the reset means and the bus speed indication signal is provided to the bus speed indication means. Upon receipt of the reset signal, the reset means causes a predetermined string of instructions to be retrieved from the instruction cache and to be executed by the execution unit. A first instruction of the predetermined string of instructions causes a value to be stored in a predetermined register of the register file. The value stored in the predetermined register of the register file is set according to the bus speed indication signal that was provided. A second instruction of the predetermined string of instructions, executed after the first instruction, provides the value stored in the predetermined register of the register file to the bus interface and thereby causes the bus interface to enter a mode wherein the bus interface operates at the selected speed specified by the bus speed indication signal.

17 Claims, 5 Drawing Sheets

*Figure 6*

SELECTION FROM A PLURALITY OF BUS OPERATING SPEEDS FOR A PROCESSOR BUS INTERFACE DURING PROCESSOR RESET

This is a continuation of application Ser. No. 08/128,586, filed Sep. 27, 1993, now abandoned.

BACKGROUND OF THE INVENTION

1. Field of the Invention

The present invention relates to the field of computer systems. More specifically, the present invention relates to the operation of an interface between a computer system component and a bus of the computer system.

2. Art Background

A bus is a set of hardware lines (wires) used for data transfer among two or more components of a computer system. A bus is essentially a shared highway that couples different parts of the system and enables these parts to transfer information. Examples of computer system components that typically communicate using a bus include a microprocessor, disk-drive controller, memory, and input/output ports.

Typically, a bus is specialized for carrying different types of information. One group of wires (usually, traces on a printed circuit board), for example, carries data. Another group of wires carries the addresses (locations) where specific information can be found. Yet another group of wires carries control signals to ensure that the different parts of the system use their shared highway without conflict.

Busses are characterized by the number of bits they can transfer at a single time. A computer with a 16-bit data bus, for example, transfers 16 bits of data at a time, and one with a 32-bit data bus transfers 32 bits at a time. The former data bus is said to have a width of 16 bits and the latter bus is said to have a width of 32 bits.

Because a bus can be integral to internal data transfer and yet computer users often need to add extra components to the system, a typical microcomputer bus will allow for expansion through one or more expansion slots (connectors for add-on circuit boards). Such boards, when they are added, make an electrical connection to the bus and effectively become part of the system.

Typically, each component coupled to a bus must obey a communication protocol established for that bus. A communication protocol is a set of rules or standards designed to enable computer components to connect with one another and to exchange information with as little error as possible. The efficiency of the communication protocol of a bus contributes to the amount of information that can be transferred across the bus during a fixed time period. Each bus also typically has a speed of operation governed by the frequency or number of communication cycles per time period.

It is typically more expensive to build a system bus that has a high operating frequency than to build a system bus that has a low operating frequency. If the frequency of the system bus is too low, the system bus becomes a bottleneck that forces computer components to remain idle while they are waiting for information to be supplied across the bus. On the other hand, if the bus speed is too high, the bus will be underutilized and harder to build. An underutilized bus can be replaced by a less expensive, slower bus without any noticeable degradation in the operation of the computer system.

Thus, it is a challenge of any computer system designer to match the bus operating speed to the needs of the target computer system being designed. To support the system designer in this goal, computer component manufacturers typically provide several models of the same computer component with each model differing only by the speed of the bus with which the processor will interface. This practice forces manufacturers to manufacture and store in inventory several versions of the same basic part.

SUMMARY OF THE INVENTION

A method and apparatus is disclosed for providing an interface from a processor to a bus. The interface is capable of operating at a speed selected from a plurality of speeds.

An execution unit is coupled to a register file. The register file comprises a plurality of registers. Each of the registers of the register file is for storing data. The execution unit is for executing instructions. An instruction cache and read only memory (ROM) is coupled to the execution unit. The instruction cache and ROM is for storing instructions that can be used by the execution unit. A reset means is also coupled to the execution unit.

Furthermore, a bus speed indication means is coupled to the execution unit and to the register files. The bus speed indication means is for receiving a bus speed indication signal. The bus speed indication signal is for indicating the selected operating speed for the bus interface.

The reset signal is provided to the reset means and the bus speed indication signal is provided to the bus speed indication means. Upon receipt of the reset signal, the reset means causes a predetermined string of micro instructions to be retrieved from the micro instruction cache and to be executed by the execution unit.

A first instruction of the predetermined string of instructions causes a value to be stored in a predetermined register of the register file. The value stored in the predetermined register of the register file is set according to the bus speed indication signal that was provided.

A second instruction of the predetermined string of instructions, executed after the first instruction, provides the value stored in the predetermined register of the register file to the bus interface and thereby causes the bus interface to enter a mode wherein the bus interface operates at the selected speed specified by the bus speed indication signal.

BRIEF DESCRIPTION OF THE DRAWINGS

The objects, features, and advantages of the method and apparatus of the present invention will be apparent from the following detailed description of the invention in which.

DETAILED DESCRIPTION OF THE INVENTION

A method and apparatus is disclosed for permitting a computer system to select the operating speed of an interface between a processor and a bus coupling the processor to the system. In this way the operating speed of the interface can be matched to the operating speed of the bus. When the processor is reset, the computer system specifies the interface operating speed from a predetermined set of operating speeds by asserting or not asserting a signal on one or more pins of the processor.

In the following description, for purposes of explanation, specific numbers, materials and configurations are set forth in order to provide a through understanding of the present invention. It will be apparent to one skilled in the art, however, that the present invention may be practiced without these specific details. In other instances, well known systems are shown in diagrammatic or block diagram form in order not to obscure the present invention unnecessarily.

Figure 1:
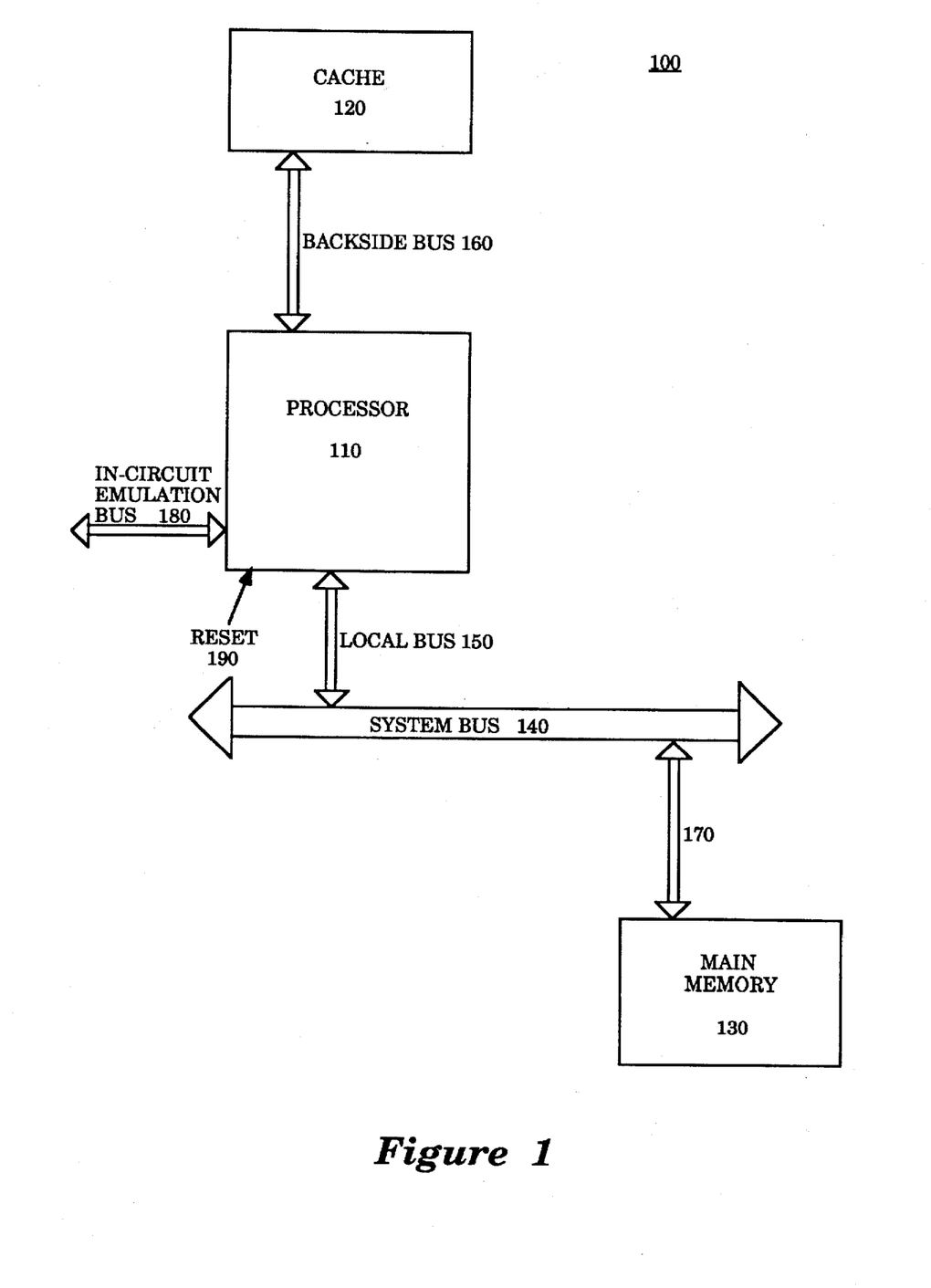
FIG. 1 illustrates a computer system with a processor that has a local bus interface that can interface with a local bus operating at any one speed from a predetermined set of speeds.

Referring now to FIG. 1, an embodiment of a computer system is illustrated wherein the computer system selects the operating speed of an interface between a processor and a bus coupling the processor to the system thereby matching the operating speed of the interface to the operating speed of the bus. In computer system 100 of FIG. 1, processor 110 is shown coupled directly to three busses.

In-circuit emulation (ICE) bus 180 is used to couple processor 110 to a host computer system (not shown) when providing in-circuit emulation for processor 110. In-circuit emulation is typically used during the development of a processor, such as processor 110, to debug the processor. During in-circuit emulation, ICE bus 110 is used to transfer instructions and data between processor 110 and the host system testing processor 110. Once processor 110 has been debugged, in-circuit emulation will no longer be required. Therefore, ICE bus 180 is typically not supplied with, or used by, production systems. A processor, such as processor 110, however, will typically continue to have the pins that were used to couple the processor to an ICE bus. This way, if in-circuit emulation is needed, it can be provided.

Processor 110 is coupled to cache 120 by backside bus 160. Cache 120 is typically fast random access memory (RAM) such as static random access memory (SRAM). Main memory 130, on the other hand, is typically comprised of relatively slower random access memory, such as dynamic random access memory (DRAM). Copies of a portion of data stored in main memory 130 are kept in cache 120. The information stored in cache 120 is selected so that cache 120 contains the information most likely to be required by processor 110 as it executes a program.

When processor 110 needs data to continue execution, processor 110 will first attempt to retrieve the information from cache 120. If cache 120 has the information (a cache "hit"), then the information can be supplied to processor 110 faster than if processor 110 had retrieved the information directly from the relatively slower main memory 130. If, on the other hand, the information processor 110 requires is not available in cache 120 (a cache "miss"), then processor 110 will retrieve the information from main memory 130.

Although not shown in FIG. 1, in one embodiment of system 100, an additional cache is provided on as part of processor 110. In the case where processor 110 has been provided with an on-board cache, the on-board cache would be checked for desired data before processor 110 tried the off-chip cache 120.

In system 100, system bus 140 is shown coupled to main memory 130 by bus 170. Similarly, system bus 140 is also coupled to processor 110 by local bus 150. Additionally, numerous other devices (not shown) can also be coupled to system bus 140. Thus, for example, a disk drive or an input/output device, such as a network adapter card, can be coupled to system bus 140. Each new device coupled to system bus 140 will increase the impedance of the system bus and thereby decrease the maximum operating speed with which the system bus can operate.

In an alternate embodiment of system 100, an additional cache (not shown) is coupled to local bus 150 or to system bus 140 to supplement cache 110. In a different alternate embodiment, there is no backside bus 110 and cache 120. In such a case, there is either no caching or caching is provided by a cache coupled to local bus 150 or to system bus 140. In an embodiment where system 100 is a multiprocessor system, multiple processors 110 are coupled to the system bus 140 using an additional corresponding local bus 150.

Because only cache 120 and processor 110 are coupled to backside bus 160, backside bus 160 will typically be able to operate at a higher frequency than can local bus 150 and system bus 140. Thus, in one embodiment, processor 110 has a core operating speed of 33 megahertz and backside bus 160 operates at that speed. On the other hand, in this embodiment, local bus 150 operates at half the core operating speed of processor 110 (i.e. 16.5 megahertz). In this embodiment, main memory 130 is implemented using DRAM and cache 120 is implemented using relatively faster SRAM. Therefore, because of the relatively slower access capability of DRAM, it is appropriate to clock system bus 140 at half the speed of processor 110.

In an alternate embodiment, the computer architecture is such that system bus 140 has few devices coupled to it and main memory 130 is implemented using fast memory such as SRAM. In this alternate embodiment, system bus 140 operates at the speed of processor 110 rather than at half speed. In this alternate embodiment, a half speed system bus 140 would become a bottleneck as processor 110 idled while waiting for data to be provided from main memory 130. Therefore, in such a high performance alternate embodiment, clocking system bus 140 at half the operating speed of processor 110 can be inappropriate. To exploit the capability of the system, local bus 150 and system bus 140 would need to be clocked at the full speed of the processor 110.

In the prior art, two versions of processor 110 would be manufactured. A first version of processor 110, specified by a first part number, would have an interface to local bus 150 that operated at full speed. A second version of processor 110, specified by a second part number, would also be manufactured. The second version would only differ from the first version by the fact that the second version would have an interface to local bus 150 that operated at half speed. Thus, if a system designer was designing a system that required a fast interface between processor 110 and main memory 130, the system designer would specify that the first version of processor 110 was to be used in the system. On the other hand, if a system designer was designing a system with a slower system bus, then the second version of processor 110 would be specified.

As will be explained below, the present invention permits computer system 100 to specify at reset the operating speed of the local bus 150 to which processor 110 is coupled. In one embodiment, this speed is specified by asserting or not asserting a predetermined signal line of ICE bus 180 when the system asserts reset signal 190 to processor 110. Then, when reset signal 190 is deasserted, processor 110 will interface with local bus 150 at full or half speed depending upon whether the predetermined pin of ICE bus 180 was or was not asserted during reset. In this way, the present invention permits a single version of processor 110 to be used in system 100 regardless of the particular operating speed selected for local bus 150.

Figure 2:
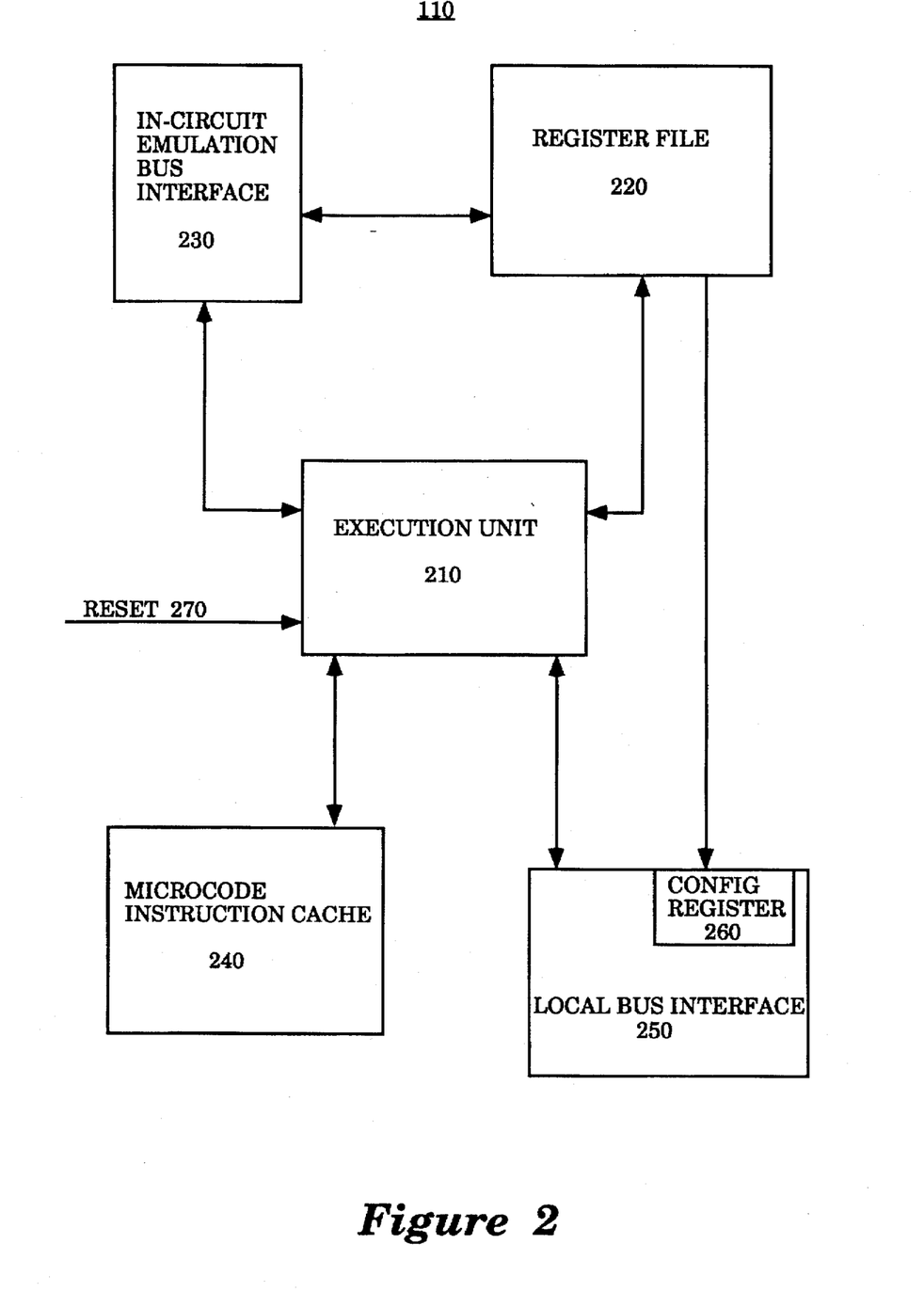
FIG. 2 illustrates the components of the processor of FIG. 1 that together provide the bus speed selection at reset.

Referring now to FIG. 2, a block diagram of processor 110 is illustrated. During normal operation, execution unit 210 retrieves instructions to be executed from microcode instruction cache 240. Execution unit 210 then operates on values stored in register file 220 based upon the instructions that were retrieved.

ICE bus interface 230 controls communication over the ICE bus between processor 110 and a host system when a host system is available. Similarly, local bus interface 250 controls communications between processor 110 and the local bus that couples processor 110 to the system bus. Configuration register 260 of local bus interface 250 contains switches that control the operation of local bus interface 250. Any request for information to be supplied to processor 110, or to be output from processor 110, across the local bus is translated by local bus interface 250 into the communications protocol of the local bus.

Reset signal 270 is provided externally to processor 110. When reset signal 270 is asserted, processor 110 executes a reset program stored in microcode instruction cache 240. Execution of the reset program causes processor 110 to enter a predetermined reset state when reset signal 270 is deasserted. Typically, during reset, local bus interface 250 will tri-state the pins coupling processor 110 to the local bus until the reset has occurred. This is because, until the processor has reached the reset state, the processor will be in a state of flux and therefore will be unable to process any information received from the local bus. Similarly, in the case where in-circuit emulation is being performed, the in-circuit emulation capability will typically not be available until reset has occurred.

In the present invention, assertion of reset signal 270 causes execution unit 210 to retrieve a reset program from microcode instruction cache 240. One of the early steps in the reset program causes ICE bus interface 230 to sample a predetermined pin of the ICE bus and then store the value sampled in a predetermined register of register file 220. Later, during the reset sequence, an instruction in the reset program causes execution unit 210 to read the predetermined register of register file 220. Based upon the value stored in the predetermined register of register file 220 the Execution unit 210 then sets a bus speed bit in configuration register 260. The bus speed bit set in configuration register 260 controls the operating speed of local bus interface 250. Therefore, at some time after reset signal 270 is deasserted, local bus interface 250 will stop tri-stating the local bus pins and communicate with the local bus at a speed specified by the value of the bus speed bit in configuration register 260. Thus, for example, if a logical one is stored in the bus speed bit, the local bus interface will communicate at full speed with the local bus. If, on the other hand, a logical zero is stored in the bus speed bit of configuration register 260, the local bus interface will communicate with the local bus at half speed.

In one embodiment, pull-up resisters internal to processor 110 cause the signals received from the ICE bus in the ICE bus interface 230 to be pulled up if no host is coupled to the ICE bus. In this embodiment, the signal on the predetermined pin of the ICE bus that indicates the speed of the local bus interface will be pulled up at reset if no host is present within the system. It is particularly helpful to define this pulling up of the predetermined pin of the ICE bus pin to indicate the default bus speed value that corresponds to the most common system. That way, in the most common system, the system will not have to set the default value when a host is not present because the default will be specified by the pull-up resister. In a system where the other (less common) operating speed of the local bus interface is required, the system designer will ensure the proper operating speed by having the system drive a signal onto the appropriate ICE bus pin at reset to pull down the value at the pin and thereby signal that the less common bus interface speed will be employed.

There are several advantages of the present invention over the prior art. A primary advantage is that a single part can be used in systems that have different speeds for the local bus. If more than two speeds are required, multiple pins of the ICE bus can be sampled at reset. Alternately, one of more than two possible speeds can be specified by multiplexing a signal on a single pin and sampling the single pin multiple times to determine the desired operating speed.

Furthermore, because most modern processors have an in-circuit emulation capability, there is no need to add to the processor an additional pin that is dedicated to specification of the operating speed of the local bus interface. In fact, even in the case of a chip that does not have in-circuit capability, any pin of the chip that is not being used by the chip at the beginning of a reset may be employed to signal the operating speed for the local bus interface.

Moreover, because the local bus interface 250 is operating at the proper operating speed of the local bus at the end of reset, the interface works simply. One could imagine an alternate approach where the configuration of the bus speed was stored externally from processor 110 in a data structure such as in main memory. In such a case, the processor would emerge from reset communicating with the local bus at the slow speed so that the processor could read main memory and determine the preferred operating speed of the system bus. Once the desired operating speed information was obtained, if a faster speech system bus was desired, the interface and the system bus would have to switch from the slow speed to the faster speed. This method would require each device coupled to the system bus to have special circuitry that would permit them to also switch from slow speed to fast speed. Such a speed switching approach would be impractical because it would place too many constraints upon other devices witch the system and would introduce an additional level of complexity as the system changed speed.

The present invention, on the other hand, requires very little-modification to the processor 110 because it employs capabilities already available within the system. The processor will typically have an in-circuit emulation capability and, as part of the in-circuit emulation capability, an ability to sample signals from the ICE bus and store the sampled signals within a register of the register file. Furthermore, the processor will typically have a microcoded reset program that is executed by the execution unit and a configuration register within the local bus interface that is used to control operating characteristics of the local bus interface.

Figure 3:
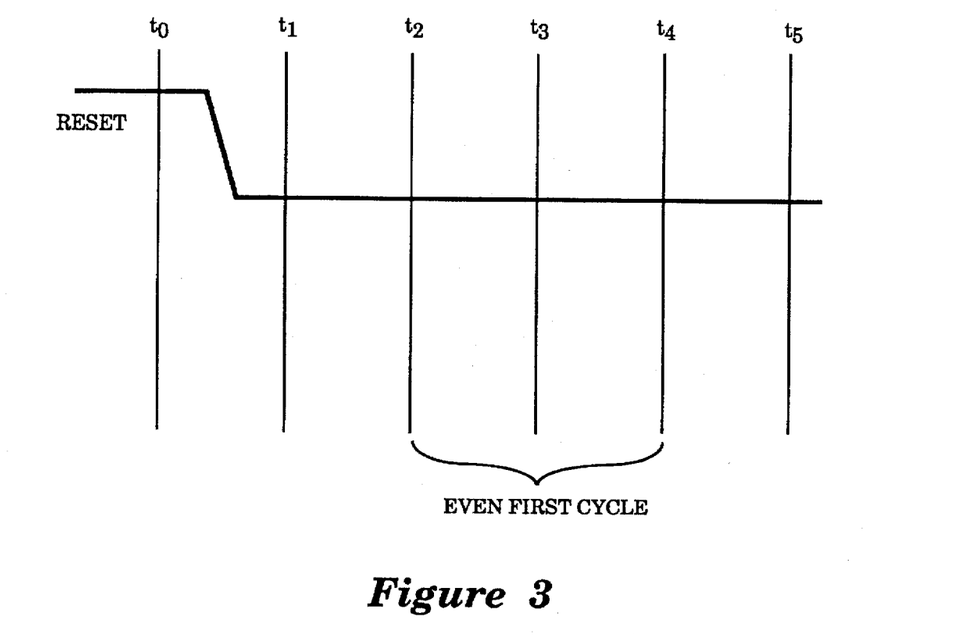
FIG. 3 illustrates the selection of half speed bus interface cycles from full speed cycles when the reset signal is deasserted during an even numbered full speed clock cycle.

Referring now to FIG. 3, a timing diagram is shown that illustrates the convention used in one embodiment of the present invention to extract a half speed clock cycle from the core clock of the processor. In FIG. 3, times $t_0$ through $t_5$ each represent a "tick" (one cycle) of the core clock of the processor. Typically, a clock is a square wave signal and each tick of the clock corresponds to the rising edge of one of the cycles of the clock signal.

In the case where the local bus interface is to operate at full speed, each tick of the core clock will provide a tick of the clock for the bus interface unit. If the bus interface unit is to operate at half speed, the bus interface unit will use a core clock tick and then skip the next core clock tick. In this way, the bus interface unit will alternate between using and not using core clock ticks. In one embodiment, the second core clock tick after the reset signal is deasserted will be the first tick of the bus interface clock in either the full speed or the half speed case. Then, in the half speed case, the bus interface unit will alternate between using and not using core clock ticks.

Figure 4:
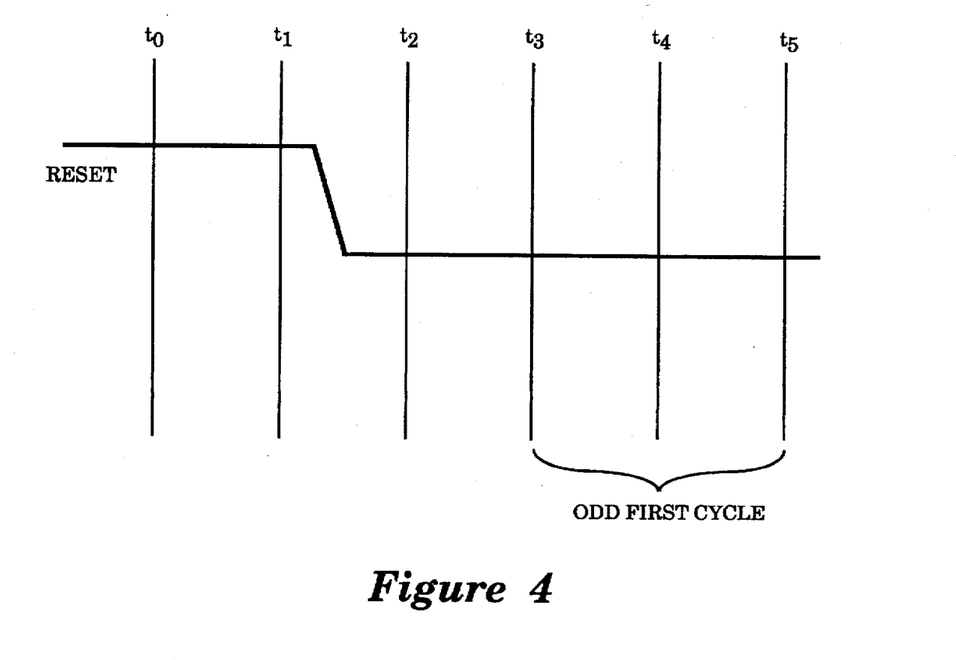
FIG. 4 represents the selection of half speed bus interface cycles when the reset signal is deasserted during an odd numbered full speed clock cycle.

Thus, in the example in FIG. 3, when the reset signal is deasserted between time $t_0$ and $t_1$, the first tick of the half speed clock will occur at time $t_2$ and the second tick of the half speed clock will occur at time $t_4$. Comparing FIG. 3 with FIG. 4, one can see that if the reset signal were deasserted between time $t_1$ and $t_2$, the first tick of the bus unit clock would occur at time $t_3$ and the second tick would occur at time $t_5$. Thus, if each tick of the core clock is assigned a number from an arbitrarily selected core clock tick, the half speed clock will be driven either by the even numbered core clock ticks or by the odd numbered core clock ticks depending upon when the reset signal is deasserted. In alternate embodiments the slow speed clock can be an integral multiple of the fast speed clock by skipping an appropriate number of fast speed clock ticks. Thus, in an alternate embodiment where the slow speed clock operates at one third the speed of the of the fast clock, every third tick of the fast clock will provide a tick of the slow clock.

Figure 5:
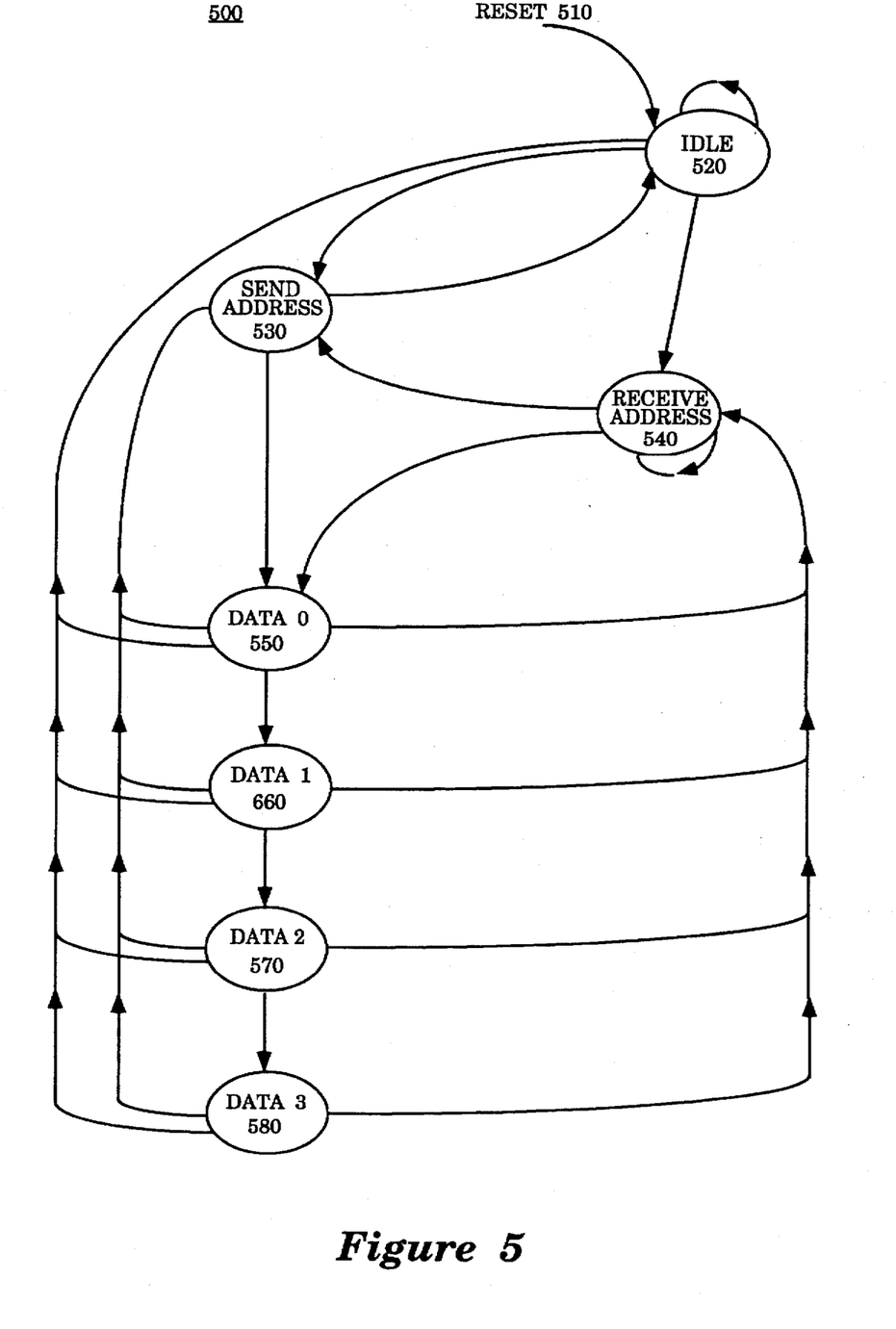
FIG. 5 illustrates a state transition diagram for a local bus interface embodiment where address and data signals are multiplexed, data is transmitted in bursts, and the interface operates at full speed.

Referring now to FIG. 5, a state transition diagram is shown for an embodiment of a full speed bus interface. In this embodiment, the protocol of the bus is such that whenever the bus interface is not communicating with the local bus, it will be in idle state 520. The local bus is multiplexed with address and data signals and data is transferred in bursts of one to four data units. In this protocol, a data unit is the amount of data that can be transmitted across the bus at a given time. In one embodiment, each data unit is equal to 16 bits and corresponds to the width of the local bus. The data unit will also typically correspond to the word size of the processor.

The present invention is being described with respect to a particular communications protocol in order to describe better describe the operation of the present invention. Many communications protocols are well known in the art, however, and it will be understood that the bus speed selection capability of the present invention can readily be applied to communications protocols other than the one described herein.

In FIG. 5, because the bus interface is operating at the same speed as the core clock of the processor, there will be a state transition with each tick of the core clock. Thus, when the system reset signal is deasserted, the bus interface unit will enter into idle state 520 where it will remain until the processor is to communicate through the local bus. The processor will communicate through the local bus by either sending or receiving data.

If the processor is to send data, a transition will occur from idle state 520 to send address state 530. In send address state 530 the address of the data to be sent will be transmitted across the bus. If this address transmission is unsuccessful (for example, because the device to receive the data is busy, and therefore, temporarily unavailable), then the bus interface will return to the idle state and try again later. If, on the other hand, the transmission is successful, then a transition will be made from send address state 530 to data 0 state 550. In data 0 state 550, the first data unit will be sent across the bus. If more than one data unit is to be sent, then a transition will occur from data 0 state 550 to data 1 state 560 and the next data unit will be sent. In the communications protocol of this embodiment, up to four data units can be sent in a given burst. If four data units are sent in a burst, then the first data unit will be sent from data 0 state 550, the second from data 1 state 560, the third from data 2 state 570 and the fourth will be sent from data 3 state 580.

When a burst of data has been sent, a transition is made from the appropriate data transmission state back to the idle state 520. In the case where an additional data burst is to be sent immediately after the first data burst has been sent, a transition is made instead to the send address state 530 where the starting address for the next data burst to be sent is transmitted across the bus. In the case where data is to be received from the bus immediately following a sent data burst, a transition will be made from the last data transmission state of the burst to the receive address state 540. In the receive address state 540, the address of the first data burst to be received is provided from the local bus to the bus interface unit. In a manner similar to that described for sending a data burst, up to four data units are then received from the local bus in states data 0 550, data 1 560, data 2 570 and data 3 580. Note that it is also possible for a transition directly from idle state 520 to receive address state 540.

Figure 6:
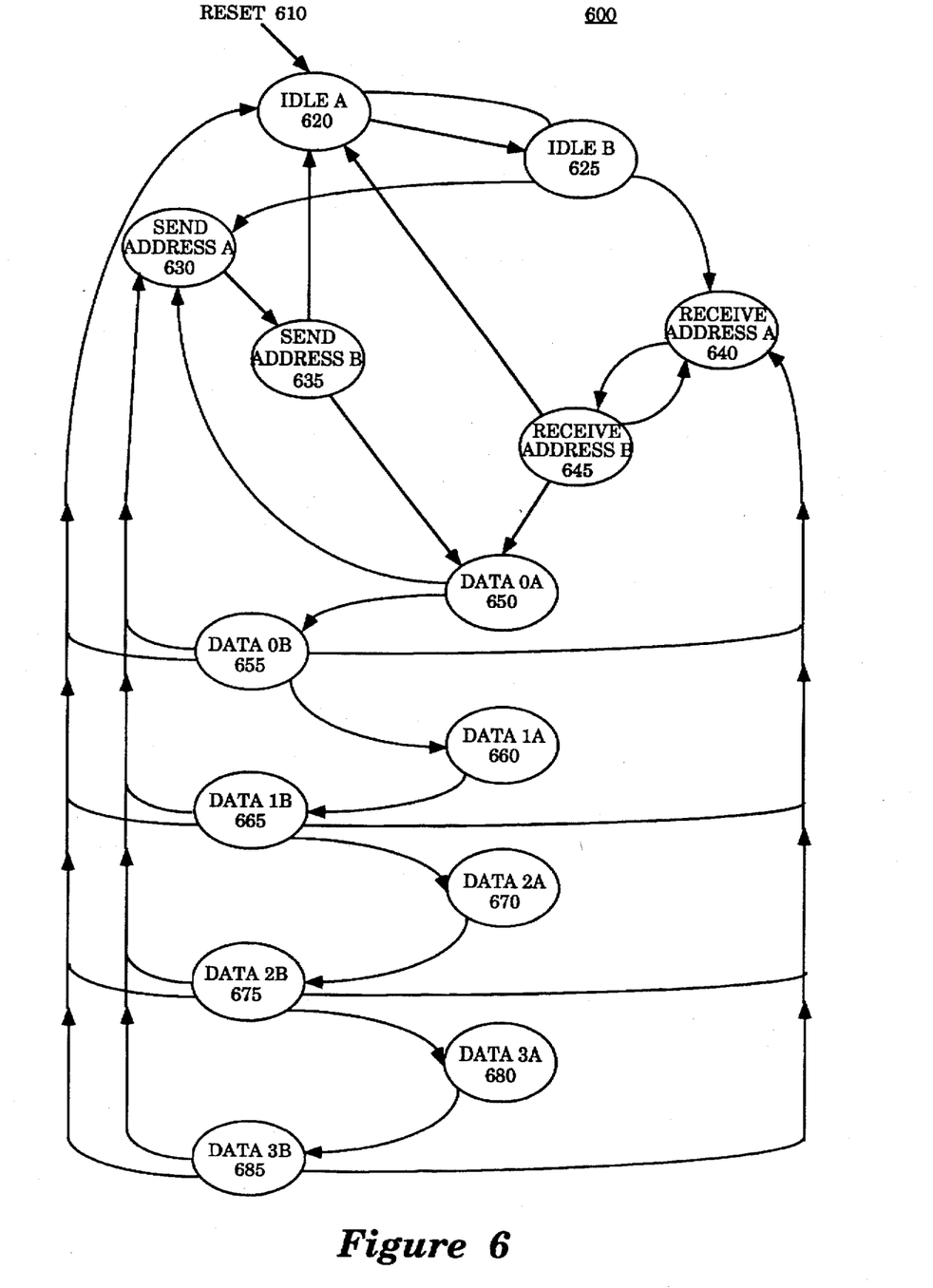
FIG. 6 illustrates a state transition diagram for the embodiment of FIG. 5 operating at half speed.

Referring now to FIG. 6, a state transition diagram is shown for the half speed implementation of the bus protocol depicted in FIG. 5. In FIG. 6, a transition is made with each tick of the core processor clock, however, each state of FIG. 5 has been divided into two states in the state transition diagram of FIG. 6. For example, idle state 520 of FIG. 5 has been divided in FIG. 6 into idle A state 620 and idle B state 625.

In FIG. 6, the state machine enters idle A state 620 upon emerging from reset. While idle, the interface unit transitions back and forth between idle A state 620 and idle B state 625 at each tick of the core clock. By dividing each state of FIG. 5 into two states and causing a state transition to occur with each tick of the full speed clock, the state transition diagram depicted in FIG. 6 causes the same operation as that of the state transition diagram of FIG. 5 with the exception that a bus interface unit operating according to the state transition diagram of FIG. 6 will operate at half the speed of one operating according to the state transition diagram of FIG. 5. The appropriate state transition scheme for the bus interface unit to use is determined by the bus speed value set at reset and stored in the configuration register of the bus interface trait.

While the method and apparatus of the present invention has been described in terms of a presently preferred and alternate embodiments, those skilled in the art will recognize that the present invention may be practiced with modification and alternation within the spirit and scope of the appended claims. The specifications and drawings are, accordingly, to be regarded in an illustrative rather than a restrictive sense.

What is claimed is:

1. A microprocessor comprising:
   an execution unit configured to execute a reset program upon receipt of a reset signal;

an in-circuit emulation (ICE) bus interface, said reset program causing said ICE bus interface to sample an ICE pin value;

a register file coupled to the execution unit, said reset program causing said ICE bus interface to store said sampled ICE pin value in a general register of said register file; and a local bus interface having a bus speed configuration register corresponding to the register file, the execution unit reading general register in response to the reset program, said execution unit setting the bus speed configuration register of the local bus interface in response to the sampled ICE pin value, the bus speed configuration register controlling operating speed of the local bus interface after completion of execution of the reset program.

2. The microprocessor as set forth in claim 1 further comprising a microcode instruction cache, said execution unit retrieving said reset program from said microcode instruction cache upon receipt of said reset signal.

3. The microprocessor as set forth in claim 1 wherein multiple ICE pin values are sampled and stored in said general register, said multiple ICE pin values are then used to set said bus speed configuration register of said local bus interface and to thereby control said operating speed of said local bus interface after completion of said reset program.

4. A method for setting operating speed of a local bus interface in a microprocessor having an execution unit, an in-circuit emulation (ICE) bus interface, a register file and the local bus interface, the method comprising the steps of:

The execution unit executing a reset program upon receipt of a reset signal;

The reset program causing the ICE bus interface to sample an ICE pin value;

The reset program causing the ICE bus interface to store the sampled ICE pin value in a general register of the register file;

The reset program causing the execution unit to read the general register; and

The execution unit setting a bus speed configuration register of the local bus interface in response to sampled ICE pin value, the bus speed configuration register controlling the operating speed of the local bus interface after completion of the execution of the reset program.

5. The method as set forth in claim 4 wherein said microprocessor has a microcode instruction cache, said method further comprising the step of:

said execution unit retrieving said reset program from said microcode instruction cache upon receipt of said reset signal.

6. The method as set forth in claim 4 wherein multiple ICE pin values are sampled and stored in said general register, said multiple ICE pin values are then used to set said bus speed configuration register of said local bus interface and to thereby control said operating speed of said local bus interface after completion of said reset program.

7. A microprocessor comprising:

execution means for executing a reset program in response to a reset signal;

in-circuit emulation (ICE) means for providing an ICE bus interface, said reset program causing said ICE means to sample an ICE pin value;

register means for storing data, said ICE means for storing said sampled ICE pin value in a general register of said register means in response to the reset program; and local bus interface means for providing a local bus interface, said local bus interface means having a bus speed configuration register of the register means corresponding thereto, said reset program causing said execution means to read said general register, said execution means setting a bus speed configuration register of said local bus interface means upon said sampled ICE pin value, said bus speed configuration register for controlling operating speed of said local bus interface means after completion of said reset program.

8. The microprocessor as set forth in claim 7 further comprising caching means for storing microcode instructions, said execution means retrieving said reset program from said caching means upon receipt of said reset signal.

9. The microprocessor as set forth in claim 7 wherein multiple ICE pin values are sampled and stored in said general register, said multiple ICE pin values are then used to set said bus speed configuration register of said local bus interface means and to thereby control said operating speed of said local bus interface means after completion of said reset program.

10. A computer system comprising:

a microprocessor;

a computer component;

a bus, coupling said microprocessor to said computer component, said bus permitting transmission of data between said microprocessor and said computer component, said bus operating at a predetermined bus operating speed;

a reset signal generator coupled to said microprocessor, said reset signal generator generating a reset signal;

bus speed indication signal generator coupled to said microprocessor, said bus speed indication signal generator generating a bus speed indication signal during a predetermined time period when said reset signal is generated, said bus speed indication signal indicating said predetermined bus operating speed of said bus;

said microprocessor having;

an execution unit configured to execute a reset program in response to a reset signal;

an in-circuit emulation (ICE) bus interface, said reset program causing said ICE bus interface to sample said bus speed indication signal as an ICE pin value;

a register file coupled to the execution unit, said reset program causing said ICE bus interface to store said sampled ICE pin value in a general register of said register file; and a local bus interface having a bus speed configuration register of the register file corresponding thereto, said reset program causing said execution unit to read said general register, said execution unit setting a bus speed configuration register of said local bus interface based upon said sampled ICE pin value, said bus speed configuration register causing said local bus interface to operate at said predetermined bus operating speed after completion of execution of said reset program.

11. The computer system as set forth in claim 10, said microprocessor further comprising a microcode instruction cache, said execution unit retrieving said reset program from said microcode instruction cache upon receipt of said reset signal.

12. The computer system as set forth in claim 10 wherein multiple ICE pin values are sampled and stored in said general register, said multiple ICE pin values are then used to set said bus speed configuration register of said local bus interface and to thereby cause said local bus interface to assume said predetermined bus operating speed after completion of said reset program.

13. A microprocessor comprising:

an execution unit configured to execute a reset program in response to a reset signal;

a first bus interface, said execution unit executing a reset program upon receipt of a reset signal, said reset program causing said first bus interface to sample a first bus interface input value;

a register file coupled to the execution unit, said reset program causing said first bus interface to store said sampled first bus interface input value in a general register of said register file; and a local bus interface having a bus speed configuration register of the register file corresponding thereto, said reset program causing said execution unit to read said general register, said execution unit configured to set the bus speed configuration register of said local bus interface in response to said sampled first bus interface input value, said bus speed configuration register controlling operating speed of said local bus interface after completion of execution of said reset program.

14. A microprocessor comprising:

execution means for executing a reset program in response to a reset signal;

first bus means for providing a first bus interface, said ICE means to for sampling a first bus interface input value in response to the reset program;

register means for storing data, said reset program causing said ICE means to store said sampled first bus interface input value in a general register of said register means; and local bus interface means for providing a local bus interface, said local bus interface means having a bus speed configuration register corresponding to the register means, said execution means configured to read said general register in response to said reset program, said execution means setting a bus speed configuration register of said local bus interface means in response to said sampled first bus interface input value, said bus speed configuration register controlling operating speed of said local bus interface means after completion of execution of said reset program.

15. A method for setting operating speed of a local bus interface in a microprocessor having an execution unit, a first bus interface, a register file and said local bus interface, said method comprising the steps of:

providing a reset signal to an execution unit;

said execution unit executing a reset program upon receipt of the reset signal;

said first bus interface sampling a first bus interface input value in response to execution of said reset program;

said first bus interface storing said sampled first bus interface input value in a general register of said register file in response to said reset program;

said execution unit reading said general register in response to execution of said reset program; and said execution unit setting a bus speed configuration register of said local bus interface in response to the sampled first bus interface input value, said bus speed configuration register controlling said operating speed of said local bus interface after completion of execution of said reset program.

16. A computer system comprising:

a microprocessor;

a computer component;

a bus, coupling said microprocessor to said computer component, said bus permitting transmission of data between said microprocessor and said computer component, said bus operating at a predetermined bus operating speed;

a reset signal generator coupled to said microprocessor, said reset signal generator generating a reset signal;

bus speed indication signal generator coupled to said microprocessor, said bus speed indication signal generator generating a bus speed indication signal during a predetermined time period when said reset signal is generated, said bus speed indication signal indicating said predetermined bus operating speed of said bus;

said microprocessor having;

an execution unit configured to execute a reset program in response to a reset signal;

a first bus interface, said first bus interface sampling said bus speed indication signal as a first bus interface input value in response to said reset program;

a register file, said first bus interface storing said sampled first bus interface input value in a general register of said register file in response to execution of said reset program; and a local bus interface having a bus speed configuration register of the register file corresponding thereto, said execution unit reading said general register in response to execution of said reset program, said execution unit setting a bus speed configuration register of said local bus interface according to said sampled first bus interface input value, said local bus interface to operating of said predetermined bus operating speed after completion of execution of said reset program.

17. A microprocessor comprising:

an execution unit capable of executing a reset program upon receipt of a reset signal;

a register file coupled to the execution unit;

an in-circuit emulation (ICE) bus interface configured to sample an ICE pin value in response to the reset program and to store the sampled ICE pin value in a general register of the register file; and a local bus interface having a bus speed configuration register corresponding to the register file, the execution unit being configured to read the general register in response to the reset program and to set the bus speed of the local bus interface according to the sampled ICE pin value, the local bus interface configured to continue at the operating speed according to the sampled ICE pin value after completion of the reset program.

\* \* \* \* \*